Aug. 4, 1959 — H. E. RITTENHOUSE — 2,898,079
FOUR-WAY VALVE
Filed Aug. 5, 1953 — 8 Sheets-Sheet 1

Fig. 1

Howard E. Rittenhouse
INVENTOR.

BY Edmund W. E. Kamm
ATTORNEY

Aug. 4, 1959 H. E. RITTENHOUSE 2,898,079
FOUR-WAY VALVE
Filed Aug. 5, 1953 8 Sheets-Sheet 3

HOWARD E. RITTENHOUSE
INVENTOR.

BY Edmund W. E. Kamm
ATTORNEY

Aug. 4, 1959   H. E. RITTENHOUSE   2,898,079
FOUR-WAY VALVE
Filed Aug. 5, 1953   8 Sheets-Sheet 6

HOWARD E. RITTENHOUSE
INVENTOR.

BY Edmund W. E. Kamm
ATTORNEY

Aug. 4, 1959

H. E. RITTENHOUSE 2,898,079

FOUR-WAY VALVE

Filed Aug. 5, 1953

HOWARD E. RITTENHOUSE
INVENTOR.

BY Edmund W. E. Kamm
ATTORNEY

United States Patent Office 2,898,079
Patented Aug. 4, 1959

2,898,079

FOUR-WAY VALVE

Howard E. Rittenhouse, Fort Wayne, Ind., assignor to Bowser, Inc., Fort Wayne, Ind., a corporation of Indiana Application August 5, 1953, Serial No. 372,479

9 Claims. (Cl. 251—30)

This invention relates to a four-way valve. More specifically, it relates to a four-way valve which utilizes poppet type valves which are motor operated so that the valve can be shifted at will and in response to small control forces.

It is an object of the invention to provide a valve which is relatively simple, yet is versatile of application.

Another object of the invention is to provide a valve in which the pressure of fluid applied to the valve is utilized in operating the valve.

A further object of the invention is to provide a valve body having shiftable heads so arranged that the porting of the valve and motor can be changed by shifting a head or the heads.

Yet another object of the invention is to provide a valve which is capable of connection in different ways to the pump and lines to effect various connections between the lines and pump when the valve is shifted.

A further object is to provide a valve which will provide pressure flow from one port to a second port and gravity flow from the second port to a third port.

Yet another object of the invention is to provide means for reversing the flow through two ports by merely reversing the valves.

These and other objects will become apparent from a study of the attached specification and the drawings which are attached hereto, form a part hereof and in which.

Figure 1:
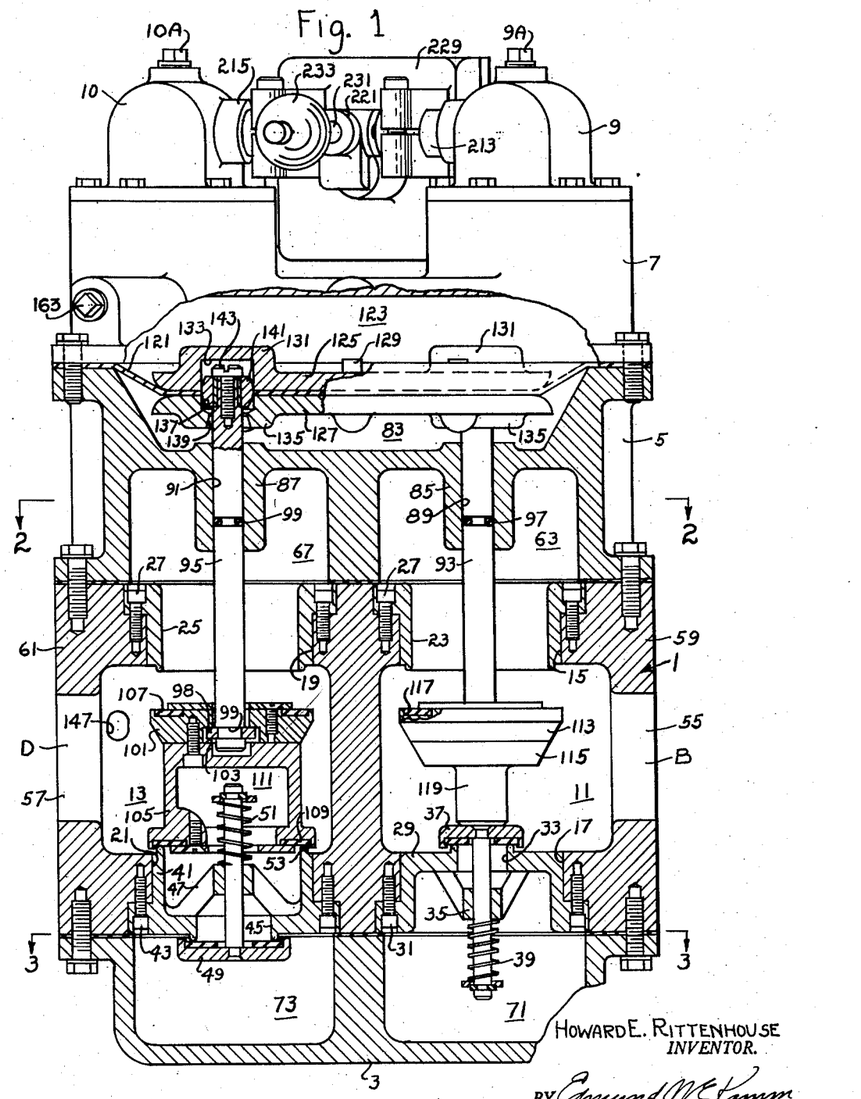
Figure 1 is an elevation with parts in section taken substantially on line 1—1 of Figure 4 showing the valves and valve operating mechanism.
Figure 2:
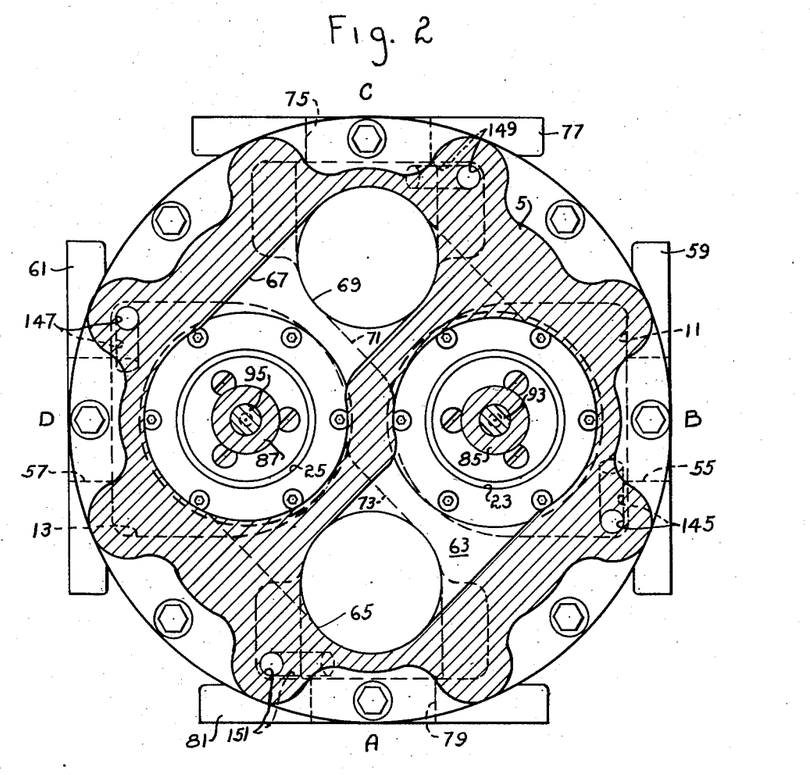
Figure 2 is a section taken on the line 2—2 of Figure 1 showing the valves and fluid passages in the top head.
Figure 3:
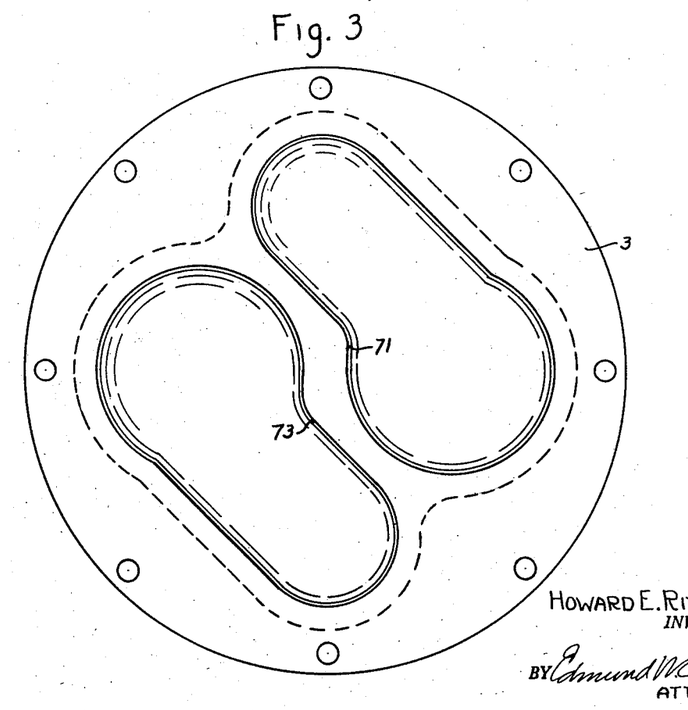
Figure 3 is a section taken substantially on line 3—3 of Figure 1 showing the passages in the bottom head.

Referring first to Figures 1, 2 and 3, the numeral 1 indicates the valve body proper, 3 the bottom head, 5 the top head, 7 the pilot valve chest and 9 and 10 the covers.

The body 1 is formed with two valve chambers 11 and 13. The chamber 11 has two opposed ports 15 and 17 and chamber 13 has two opposed ports 19 and 21. The opposed ports in each chamber are in axial alignment and the axes of the two sets of ports are substantially parallel.

Ports 15 and 19 are fitted with removable seats 23, 25 respectively which are held in place by screws 27.

Port 17 is fitted with a removable check valve body 29 which is held in place by screws 31. The body has a port 33 and a valve guide 35 in which is mounted a check valve 37 which is urged to seat in closing relation over the port 33 by a spring 39. The check valve will open with a flow of fluid into the chamber 11.

The port 21 is fitted with a removable check valve body 41 which is held in place by screws 43. The body has a port 45 and a valve guide 47 in which the check valve 49 is mounted so as to open with flow from the chamber. A spring 51 normally urges the check valve in a direction to close the port.

The check valve body 41 is also provided with a seat 53 facing the chamber 13.

Chambers 11 and 13 are also provided with lateral ports 55, 57 which communicate with the exterior of the body 1 so as to be connected with pipes, as will be described below, by means of flanges 59, 61.

As shown in Figure 2, the head 5 includes a laterally extending chamber 63 which connects the port 15 with a vertical bore 65 formed in the body, the axis of which runs substantially parallel to the axes of ports 15, 19. A similar lateral extension 67 in the body connects port 19 with a vertical bore 69.

As shown in Figures 2 and 3, the head 3 includes a laterally extending chamber 71 which connects the port 33 with the bore 69 and a laterally extending chamber 73 which connects the port 45 with the bore 65.

The bore 69 communicates with the exterior of body 1 through a lateral port 75 and flange 77 while bore 65 communicates with the exterior of body 1 through a lateral port 79 and a flange 81. For purposes of simplifying reference to the various connections to the body, the position of port 79 is indicated by A, port 55 by B, port 75 by C and port 57 by D.

Referring again to Figure 1, the head 5 is formed with a diaphragm chamber 83 and with a pair of guide bosses 85, 87 which are coaxial respectively with ports 15 and 19. The bosses are bored at 89 and 91 to receive the valve rods 93, 95. An O-ring seal 97, 99 is fitted on the rods within the bosses to prevent leakage therethrough.

The lower end of rod 95 is fitted with a washer 98 which is confined between a shoulder 99 on the upper valve body 101 and a face 103 on the lower valve body 105.

The upper valve body 101 carries a valve facing 107 which seats on the valve seat 25, while the lower valve body 105 carries a facing 109 which seats on the valve seat 53 as the valve is moved up or down by its rod. The lower valve body is recessed at 111 to clear the stem or check valve 49.

The rod 93 carries the valve body 113, 115 by means of an arrangement similar to that described. The upper valve body 113 carries a valve facing 117 which cooperates with valve seat 23 while the lower valve body carries a projection 119 which is adapted to push on the check valve 37 to insure that it seats when the valve rod 93 descends.

Thus both sets of valve bodies 101, 105 and 113, 115 are loosely connected with their respective rods 95, 93 so that the valves will be self aligning with the valve seats.

A diaphragm 121 is held in sealed condition on the top head 5 by means of pilot valve chest 7 which is also formed with a diaphragm chamber 123.

The diaphragm is connected with the piston rods by means of upper and lower diaphragm followers 125, 127 respectively which are disposed on opposite sides of the diaphragm and held together by screws 129.

The valve rods 93 and 95 are connected to the followers in the same way and therefore only the connection of rod 95 need be shown and described.

The upper follower is provided with a boss 131 which is recessed at 133. The lower follower is provided with a boss 135 which has a complementary recess 137 which is pierced at 139 to pass the valve rod. The diaphragm is cut away so that the recesses form a chamber. A roll 141 is fixed to the end of the valve rod by a screw 143 and the face of the roll is formed spherically so that it will contact, but not bind in the chamber.

Thus, as the diaphragm and followers are raised and lowered, the valve rods and valves will follow. Further, the diaphragm and followers can tilt slightly so that if one valve seats before the other, the tilting will insure the seating of the other valve.

Figure 5:
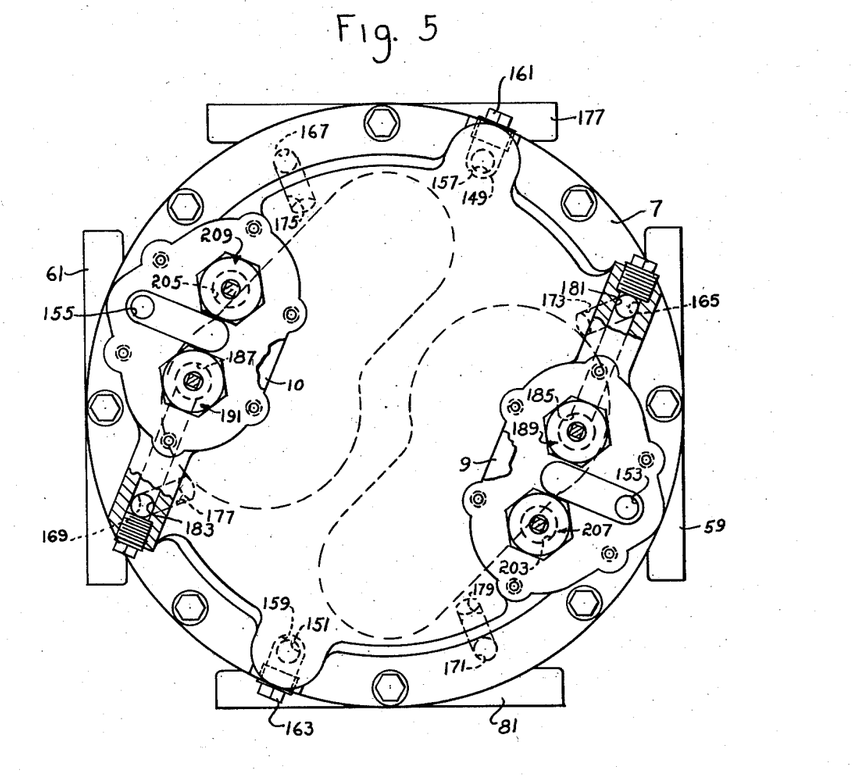
Figure 5 is a plan view of the cover.
Figure 6:
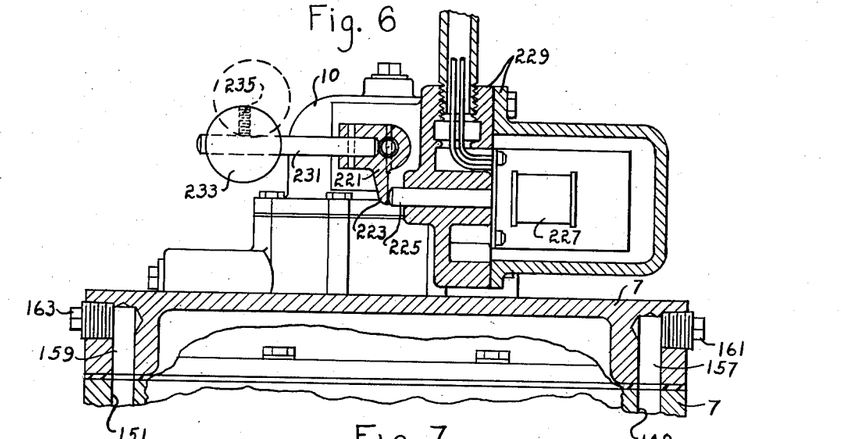
Figure 6 is a section taken substantially on line 6—6 of Figure 4 showing the remote control means for the pilot valves.

As shown, particularly in Figure 2, each of the lateral ports 55, 57, 75, 79 of the body 1 is in communication with a channel 145, 147, 149, 151 respectively which extends up through the head 5 and valve chest depending upon the rotated position of the valve chest, either aligns with a passage 153, 155 therein and terminates in one or the other of the covers 9, 10 (Figure 5) or it terminates in a chamber 157, 159 which is sealed by a plug 161, 163 (Figure 6).

Thus one pair of the diametrically opposed channels conduct fluid under pressure to the valve covers while the other two are normally blanked.

Figure 4:
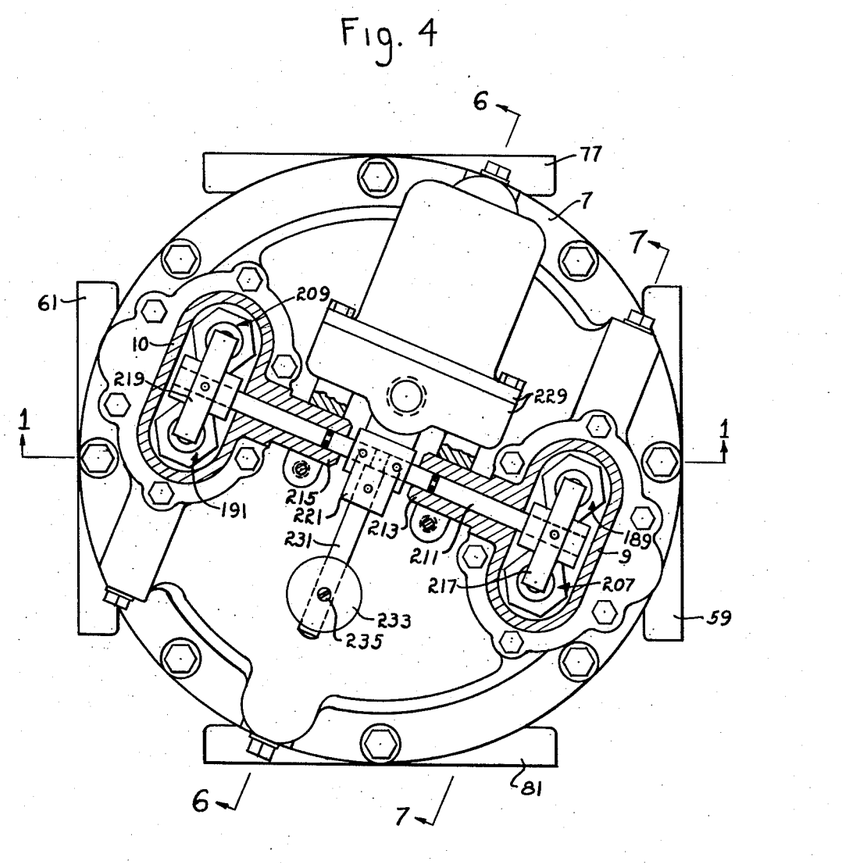
Figure 4 is a plan view of the cover, partly in section, showing the pilot valve mechanism.
Figure 7:
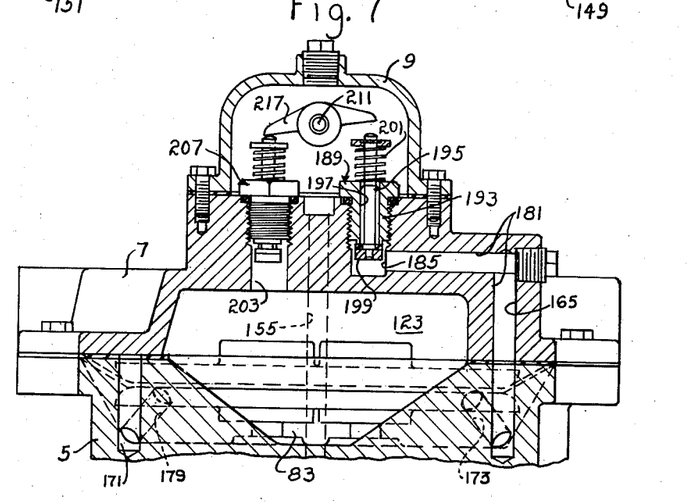
Figure 7 is a section taken substantially on the line 7—7 of Figure 4 showing the pilot valve mechanism.

Referring to Figures 4, 5 and 7 particularly, four conduits 165, 167, 169 and 171 are formed in the head which are located 90 degrees apart and extend vertically downwardly until they communicate with cross-conduits 173, 175, 177 and 179 which terminate in the lower diaphragm chamber 125.

Two of the channels 165 and 169 communicate with channels 181, 183 formed in the valve chest and which terminate in chambers 185, 187 under the cover 9 and 10 respectively.

Pilot valve assemblies 189, 191 are fitted into these chambers and since the constructions are identical only the assembly 189 will be described.

The assemblies comprise a valve body 193 which has a seat on its lower end and has a valve stem 195 guided in the bore 197 which communicates with the interior of the cover 9. The valve stem carries a valve 199 at its lower end which is urged to closing position on the seat by a spring 201. Thus, when the stem is depressed, the valve opens to establish communication between a port of the body 1 and the lower diaphragm chamber.

Second channels 203, 205 connect the covers 9 and 10 respectively with the upper diaphragm chamber 123 as shown in Figure 7. The upper ends of the channels are chambered to receive a pilot valve assembly 207, 209. The valve assemblies are identical with the assembly 189 already described so that no further description is believed necessary.

As shown in Figures 4, 6 and 7, a shaft 211 is mounted in bearings 213, 215 on the covers 9, 10 and carries on the end disposed in cover 9, a rocker 217 while it carries a similar rocker 219 in the cover 10. The rockers are double armed and one arm of rocker 217 actuates the valve assembly 189 to open the valve while the other operates the assembly 207 to open the valve as the rocker moves clockwise (Figure 7) and counterclockwise respectively.

The clockwise operation of the shaft will cause rocker 219 to open the valve assembly 209 while counterclockwise motion will open the valve of 191. The valve springs close the valves which are not being actuated so that in clockwise rotation, the upper diaphragm chamber is in communication with one port of the body 1 while the lower chamber is in communication with the diametrically opposite port of body 1. When the rockers are turned counterclockwise the connections are reversed.

By rotating the valve chest 90 degrees, the unused connections to the body ports are connected to the covers while those just described are blanked.

Rotation through an additional 90 degrees simply reverses the connection of the first mentioned ports to the covers and a further 90 degree shift will reverse the connections to the second set of ports (which were initially blanked). Thus, there are four possible positions of the valve chest, any one of which may be selected to secure the proper pressure and evacuation connections required for the operation of the diaphragm.

The shaft 211 may be manually operated to secure the required setting of the pilot and main valves. However, in order that the control of the pilot valves may be effected from a remote point, the solenoid actuator shown may be used.

As shown, particularly in Figures 4 and 6, the shaft 211 is fitted with a lever 221 which is pinned thereto. One arm 223 depends at right angles to a push rod 225 which forms the armature of a solenoid 227 which is mounted in a case 229 attached to the exterior of bearings 213, 215.

An arm 231 is fixed to the lever and extends at right angles to arm 223 and in a substantially horizontal direction. A weight 233 is slidably mounted on the arm and may be fixed thereto by a screw 235.

The weight normally holds the rocker arms 217, 219 in a position such that the valve assemblies 207, 191 are open. When the solenoid 227 is energized, the armature is ejected and moves the weight to the dashed line position (Figure 6) in which the valve assemblies 207, 191 are freed and the valves are closed while the valve assemblies 189, 209 are actuated to open the valves.

*Operation*

Assume that the structure is that disclosed in Figures 1 to 9 in which a pump has its suction connected at B and its discharge connected to D, the conduits 145—153 connect the cover 9 to the pump suction at B while conduits 147, 155 connect the cover 10 with the pump discharge at D. The former conduits and cover will be subjected to a relatively low pressure while the latter will be connected to a relatively high pressure.

Also assume that the valve body is connected to a tank such as an underground fuel storage tank at A and to a discharge line such as a fueling hose at C with the object of withdrawing liquid from the tank and dispensing it through the hose as in fueling an airplane or filling a tank truck, etc.

Figure 9:
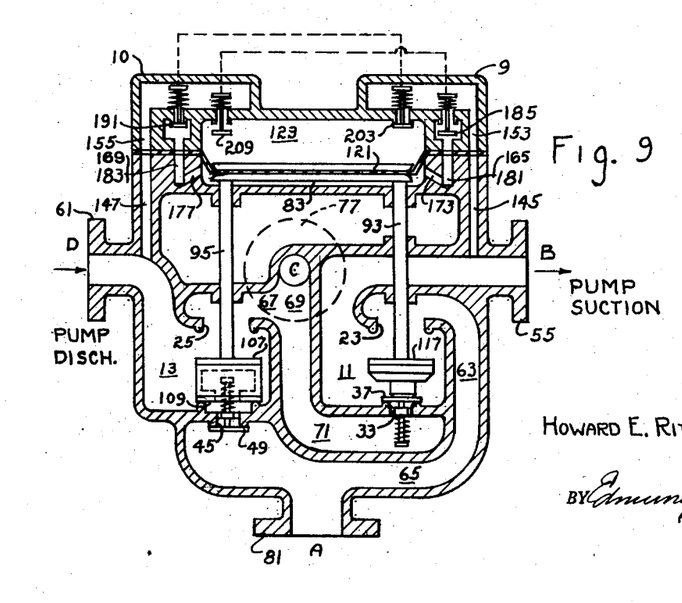
Figure 9 is a view similar to Figure 8, but showing the flow when the valves are reversed.

The solenoid 227 will be energized to cause valve assemblies 189 and 209 to open and 191 and 207 to close, as shown in Figure 9. The pump discharge pressure will be applied through conduits 147, 155, cap or cover 10 and valve assembly 209 to the upper diaphragm chamber 123 while pump suction pressure will be applied through conduits 145, 153, cap 9, valve assembly 189, ducts 181 and 173 to the lower diaphragm chamber 83. The difference in pressures causes the diaphragm to be forced downwardly to the Figure 9 position and the valves 109 and 37 are held closed.

Under such conditions liquid will be drawn from the tank, through connection A, passages 65, 63, port 23 and valve 117 and connection B to the pump. The liquid will then be discharged under pump pressure into the valve through connection D, through port 25, passages 67 and 69 to the connection C and thus to the hose and the tank which is to be filled.

When the dispensing is completed, it may be that the tank has been overfilled or that liquid is to be withdrawn to collapse the hose in order to render it more easy to handle.

In such case, the solenoid 227 will be deenergized, so that valve assemblies 191 and 207 will be opened and 189, 209 closed by the weight 233. Under these conditions, as shown in Figure 8, the pump pressure will be applied through ducts 147, 155, cover 10, valve 191, ducts 183 and 177 to the lower diaphragm chamber while suction pressure is applied through ducts 145, 153, cap 9 and valve 207 to the upper diaphragm chamber 123.

Figure 8:
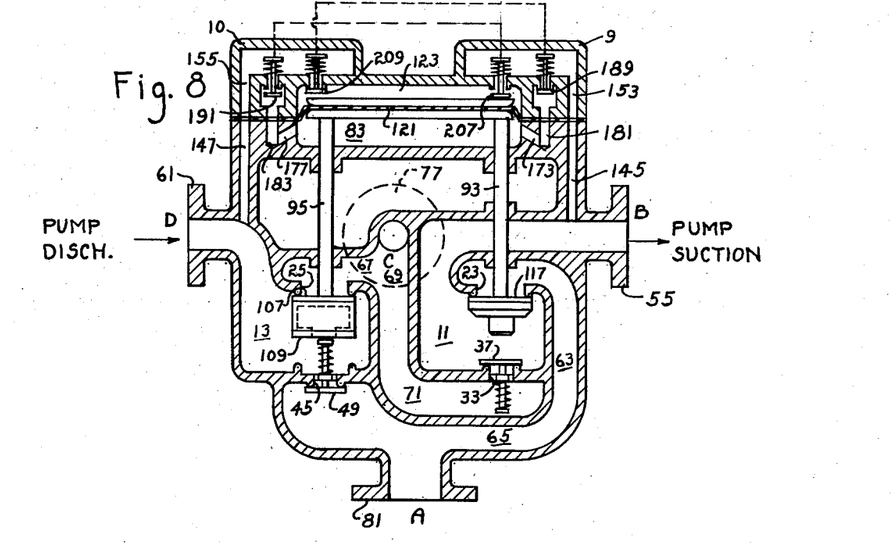
Figure 8 is a diagrammatic view of the valve showing the flow through the valve with the valves in one position.

The diaphragm 121 will be raised by the difference in pressures so that the main valves 107 and 117 will close the ports 25 and 23 respectively as shown in Figure 8.

With the valves in this position, liquid will be drawn from the hose through connection C, passages 69, 71, check valve 37, chamber 11, connection B to the suction side of the pump. From the discharge side of the pump through the connection D, chamber 13, check valve 49, chamber 73 and passage 65 to the tank connection A.

Thus the reversal of the valves effects a reversal of the flow through the connections A and C and liquid is returned from the hose to the tank.

The check valves 49 and 37 prevent any reverse flow when the main valves are in their Figure 9 positions.

*Modified form*

The valve may be made a universal valve by the simple expedient of eliminating the check valves 37, 49 and controlling the ports 33, 45 by means of the main valve.

The term "universal" is here used to indicate that the pump and pipe connections may be made, in any order, to the body to produce an operative system. The various connections are diagrammatically shown in Figures 11 to 16.

Figure 10:
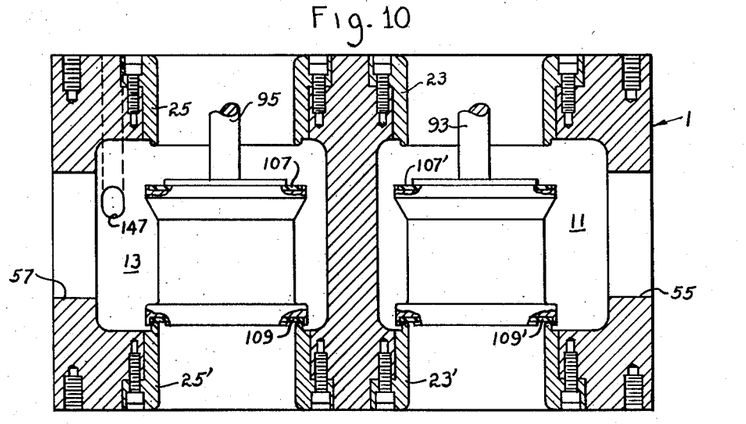
Figure 10 is a vertical sectional view of a valve body in which the main valves only are used to control the ports and check valves are eliminated.

As shown in Figure 10, the check valves 37 and 49 may be eliminated along with the special bodies 41 and 29 and valve bodies 23' and 25' similar to 23 and 25 are substituted. Also a valve 107'—109' which is identical to the valve 107—109 described above is substituted for the valve 117 shown in Figure 1.

Thus, flow may be in either direction through the ports 23', 25' instead of only one way as is the case where check valves are used.

Figure 11:
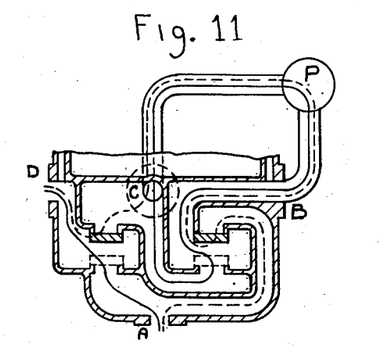
Figure 11 is a diagrammatic view of a valve modified by removing the check valves, showing the flow of liquid with the valves in the two possible positions, with the pump connected to ports B and C.

*Figure 11 connections*

Referring to Figure 11, assuming that pump P has its suction connected at B and discharge at C, with the solenoid energized, the main valves will occupy the dashed line condition and the flow will be from A to B to pump, to C and out at D as shown by the dashed line.

With the solenoid deenergized, the main valves will occupy their full line positions. In this case the flow would be as shown by one solid line, from B through the pump P, to C and back to B so that the liquid from the pump is merely by-passing or circulating. The connections A and D are directly connected so that flow may occur in either direction as shown by the other solid line, depending upon the pressure differential across the connections.

The reversal of the pump would merely reverse the direction of flow induced by the pump in either of the two cases explained above.

Figure 12:
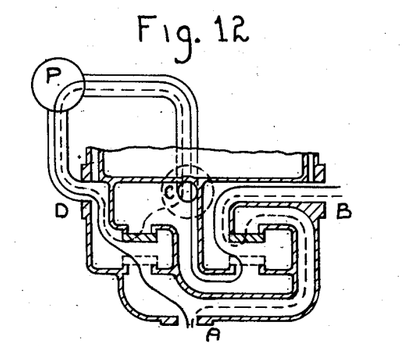
Figure 12 is a view similar to Figure 10 but showing the pump connected to ports C and D.

*Figure 12 connections*

In Figure 12 the pump suction is connected at C and the discharge at D.

In such case, with the solenoid energized and the main valves in the dashed line position, the pump flow would be by-passing from C to pump P, to D and back to C as shown by one dashed line. Connections A and B would be in direct communication, independent of the pump as indicated by the other dashed lines.

With the solenoid deenergized and the valves in the full line position, the pump induced flow would be from B to C, to pump P, to D, to A and out as shown by the solid line.

Reversal of the pump would merely reverse the direction of the pump induced flow.

Figure 13:
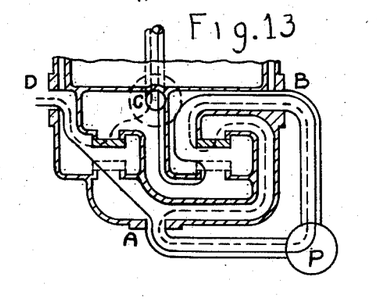
Figure 13 is a view similar to Figure 10 but showing the pump connected to ports A and B.

*Figure 13 connections*

In Figure 13, the pump has its suction connected to A and discharge to B.

In such a situation, with the solenoid energized, the main valves would occupy the dashed line position and flow would be circulating from A to pump P, to B and back to A as shown by one dashed line. Ports C and D would be directly connected as shown by the second dashed line.

With the solenoid deenergized and the main valves in the full line position, the flow will be from D, to A, to pump P, to B, to C and out as shown by the full line.

Again reversal of the pump either by changing direction of rotation or by reversing connections, merely reverses the pump induced flow.

Figure 14:
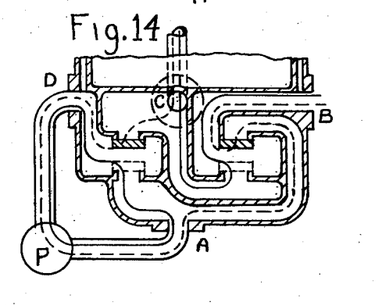
Figure 14 is a view similar to Figure 10 showing the pump connected to ports A and D.

*Figure 14 connections*

In this case, the suction is connected at D and the discharge at A.

With the solenoid energized, the main valves occupy the dashed line positions and the flow is from C, to D, to pump P, to A, to B and out as shown by the dashed lines.

With the solenoid deenergized and the main valves in the full line positions, liquid circulates from D, to pump P, to A and back to D as shown by one solid line, while C and B are directly connected as shown by the other solid line.

Figure 15:
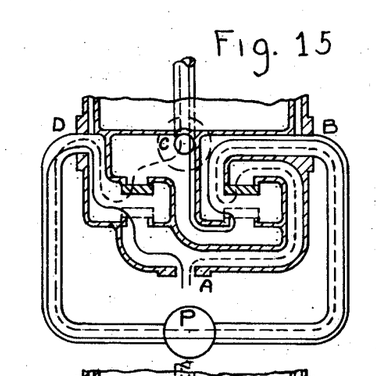
Figure 15 is a view similar to Figure 10 showing the pump connected to ports B and D.

*Figure 15 connections*

With the solenoid energized and the main valves in the dashed line positions, and the pump suction connected at B and the discharge at D, the flow as shown by the dashed line is from A, to B, to pump P, to D, to C and out.

When the solenoid is deenergized and the valves occupy their solid line positions, the flow is from C, to B, to pump P, to D, to A and out as shown by the solid line, or simply a reversal of the initial flow. Reversal of the pump would in this case reverse both directions of flow.

Figure 16:
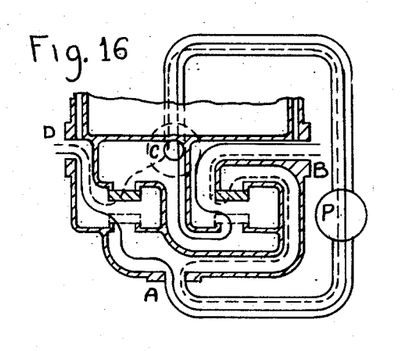
Figure 16 is a view similar to Figure 10 showing the pump connected to ports A and C.

*Figure 16 connections*

With the pump suction connected at A and the discharge at C and with the solenoid energized so that the main valves occupy their dashed line positions, the flow will be from B, to A, to pump P, to C, to D and out as shown by the dashed line.

When the solenoid is deenergized to move the main valves to their full line positions, the flow is reversed from D, to A, to pump P, to C, to B and out as shown by the solid line.

Reversal of the pump will, of course, reverse the directions of the flow explained above.

As an example of the use to which the arrangements shown in Figures 11 to 14, inclusive, may be put, let it be assumed with respect to Figure 11 that a conduit from the discharge of a tank car is connected at A while the above ground storage tank is connected at D.

With the main valves in the dashed line positions, liquid will be drawn from the tank car and forced into the storage tank. After the tank car has been emptied, the conduit may be connected to a loading rack and with the main valves in the solid line position, the liquid in the storage tank can be drained by gravity to the loading rack and to tank trucks which are spotted there for loading.

Figure 17:
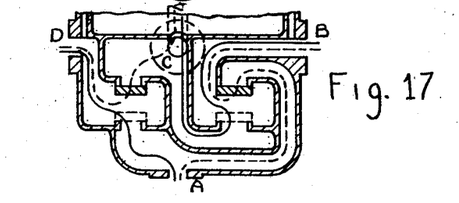
Figure 17 is a view similar to Figure 10 but omitting the pump showing the switching of fluid from one port to one or the other of two other ports.

*Figure 17 connections*

It is, of course, obvious that there are many other applications for the valve. If for example, a source of one product is applied under pressure at A and another different product at C, when the main valves occupy the dashed line position, the product from A will be discharged at B and that from C will be discharged at D.

When the main valves are in their solid line positions, the product from A will be discharged at D and that from C will be discharged at B. The flows are thus switched.

*Control connections*

Since the supply of control fluid at a proper pressure for actuating the diaphragm under control of the pilot valce assemblies may not be available in the diametrically opposite conduits 153—155 or 149—151, in such case the required pressures may be found in conduits which are 90 degrees apart, such as 153—149 or 153—151; 155—149 or 155—151. In the case the combination 153—149 is needed, the conduit 155 under cap 10 can be plugged, the plug 10A will be removed as will be plug 161 and a tube can be run between the two openings.

Similar arrangements can be made to effect the other suggested combinations if they are needed.

In case no suitable pressures are available in the various ports, the conduits 149, 151, 153 and 155 can all be plugged and the caps 9 and 10 be connected by conduits to external sources of adequate pressure.

It will thus be seen that the valve lends itself readily to various applications and to either manual or remote control and for operation by the pressure of fluid passing through the valve or by an independent source of control pressure. The structure is simple and rugged, yet positive in operation.

It is obvious that various changes may be made in the form, structure and arrangement of parts without departing from the spirit of the invention. Accordingly, applicant does not desire to be limited to the specific embodiment disclosed herein primarily for purposes of illustration; but instead, he desires protection falling fairly within the scope of the appended claims.

What I claim to be new and desire to protect by Letters Patent of the United States is:

1. In a valve mechanism, a body defining first and second chambers, each having first and second axially aligned ports and each having a lateral port communicating with the exterior of the body, said body also defining third and fourth chambers, each having a lateral port communicating with the exterior of the body, means defining conduits connecting the first ports of said first and second chambers with said third and fourth chambers respectively and additional means defining conduits connecting the second ports of said first and second chambers with said fourth and third chambers respectively, valve means mounted in each of said first and second chambers for movement to open and close said first and second ports, and power means connected to move said valves comprising a double-ended fluid motor, pilot valve means for controlling the admission and exhaust of fluid to and from each end of said motor, conduits, one communicating with each of said lateral ports and means for selectively connecting said conduits with said pilot valve means to provide fluid under high pressure to one and fluid under a lower pressure to the other.

2. In a valve mechanism, a body defining first and second chambers, each having first and second axially aligned ports and each having a lateral port communicating with the exterior of the body, said body also defining third and fourth chambers, each having a lateral port communicating with the exterior of the body, means defining conduits connecting the first ports of said first and second chambers with said third and fourth chambers respectively and additional means defining conduits connecting the second ports of said said first and second chambers with said fourth and third chambers respectively, valve means mounted in each of said first and second chambers for movement to open and close said first and second ports, fluid actuated, double-ended power means connected to move said valves, a valve chest connected with said body, two pairs of pilot valves mounted on said chest, a cover for each pair, a conduit extending from each lateral port and terminating adjacent said chest, a channel extending from each cover, each of said channels having a terminal disposed to communicate with one of said conduits, ducts connecting each cover with opposite ends of said power means, said pilot valves disposed, one in each duct, to control the flow of fluid therethrough.

3. In a valve mechanism, a body defining first and second chambers, each having first and second axially aligned ports and each having a lateral port communicating with the exterior of the body, said body also defining third and fourth chambers, each having a lateral port communicating with the exterior of the body, means defining conduits connecting the first ports of said first and second chambers with said third and fourth chambers respectively and additional means defining conduits connecting the second ports of said first and second chambers with said fourth and third chambers respectively, valve means mounted in each of said first and second chambers for movement to open and close said first and second ports, fluid actuated, double-ended power means connected to move said valves, a valve chest connected with said body, two pairs of pilot valves mounted on said chest, a cover for each pair, a conduit extending from each lateral port and terminating adjacent said chest, a channel extending from each cover, each of said channels having a terminal disposed to communicate with one of said conduits, ducts connecting each cover with opposite ends of said power means, said pilot valves disposed, one in each duct, to control the flow of fluid therethrough, means for actuating one of each pair of pilot valves simultaneously, said pilot valves including one controlling a duct communicating with one end and the other communicating with the other end of said power means.

4. In a valve mechanism, a body defining first and second chambers, each having first and second axially aligned ports and each having a lateral port communicating with the exterior of the body, said body also defining third and fourth chambers, each having a lateral port communicating with the exterior of the body, means defining conduits connecting the first ports of said first and second chambers with said third and fourth chambers respectively and additional means defining conduits connecting the second ports of said first and second chambers with said fourth and third chambers respectively, valve means mounted in each of said first and second chambers for movement to open and close said first and second ports, fluid actuated, double-ended power means connected to move said valves, a valve chest connected with said body, two pairs of pilot valves mounted on said chest, a cover for each pair, a conduit extending from each lateral port and terminating adjacent said chest, a channel extending from each cover, each of said channels having a terminal disposed to communicate with one of said conduits, ducts connecting each cover with opposite ends of said power means, said pilot valves disposed, one in each duct, to control the flow of fluid therethrough, means for opening one of each pair of pilot valves simultaneously, said pilot valves including one controlling a duct communicating with one end and the other communicating with the other end of said power means, and means for normally urging said pilot valves closed.

5. In a valve mechanism, a body defining first and second chambers, each having first and second axially aligned ports and each having a lateral port communicating with the exterior of the body, said body also defining third and fourth chambers, each having a lateral port communicating with the exterior of the body, means defining conduits connecting the first ports of said first and second chambers with said third and fourth chambers respectively and additional means defining conduits connecting the second ports of said first and second chambers with said fourth and third chambers respectively, valve means mounted in each of said first and second chambers for movement to open and close said first and second ports, fluid actuated, double-ended power means connected to move said valves, a valve chest connected with said body, two pairs of pilot valves mounted on said chest, a cover for each pair, a conduit extending from each lateral port and terminating adjacent said chest, a channel extending from each cover, each of said channels having a terminal disposed to communicate with one of said conduits, ducts connecting each cover with opposite ends of said power means, said pilot valves disposed, one in each duct, to control the flow of fluid therethrough, means for actuating one of each pair of pilot valves simultaneously, said pilot valves including one controlling a duct communicating with one end and the other communicating with the other end of said power means and additional power means connected to operate the actuating means.

6. In a valve mechanism, a body defining first and second chambers, each having first and second axially aligned ports and each having a lateral port communicating with the exterior of the body, said body also defining third and fourth chambers, each having a lateral port communicating with the exterior of the body, means defining conduits connecting the first ports of said first and second chambers with said third and fourth chambers respectively and additional means defining conduits connecting the second ports of said first and second chambers with said fourth and third chambers respectively, valve means mounted in each of said first and second chambers for movement to open and close said first and second ports, fluid actuated, double-ended power means connected to move said valves, a valve chest connected with said body, two pairs of pilot valves mounted on said chest, a cover for each pair, a conduit extending from each lateral port and terminating adjacent said chest, a channel extending from each cover, each of said channels having a terminal disposed to communicate with one of said conduits, ducts connecting each cover with opposite ends of said power means, said pilot valves disposed, one in each duct, to control the flow of fluid therethrough, said conduit terminals being disposed in equally spaced relation about a central axis and said channel terminals being disposed on diametrically opposite sides about said axis so that the shifting of said valve chest about said axis will bring said channel terminals successively into communication with said conduit terminals.

7. In a valve mechanism, a body defining first and second chambers, each having first and second axially aligned ports and each having a lateral port communicating with the exterior of the body, said body also defining third and fourth chambers, each having a lateral port communicating with the exterior of the body, means defining conduits connecting the first ports of said first and second chambers with said third and fourth chambers respectively and additional means defining conduits connecting the second ports of said first and second chambers with said fourth and third chambers respectively, valve means mounted in each of said first and second chambers for movement to open and close said first and second ports, and fluid actuated, double-ended power means connected to move said valves, a valve chest, first and second valve covers mounted thereon, first and second pilot valves mounted in one cover and third and fourth pilot valves mounted in a second cover, ducts for connecting the first and third pilot valves to one end of the power means and the second and fourth pilot valves to the other end of said power means, operating means for actuating the first and fourth valves and the second and third valves simultaneously and means for applying fluid under one pressure to one cover and fluid under a different pressure to the other cover.

8. In a valve mechanism, a body defining first and second chambers, each having first and second axially aligned ports and each having a lateral port communicating with the exterior of the body, said body also defining third and fourth chambers, each having a lateral port communicating with the exterior of the body, means defining conduits connecting the first ports of said first and second chambers with said third and fourth chambers respectively and additional means defining conduits connecting the second ports of said first and second chambers with said fourth and third chambers respectively, valve means mounted in each of said first and second chambers for movement to open and close said first and second ports, and fluid actuated, double-ended power means connected to move said valves, a valve chest, first and second valve covers mounted thereon, first and second pilot valves mounted in one cover and third and fourth pilot valves mounted in a second cover, ducts for connecting the first and third pilot valves to one end of the power means and the second and fourth pilot valves to the other end of said power means, operating means for actuating the first and fourth valves and the second and third valves simultaneously, and means for applying fluid under one pressure from one of said lateral ports to one of said covers and additional means for applying fluid under a different pressure from another of said lateral ports to the other cover.

9. In a valve mechanism, a body defining first and second chambers, each having first and second axially aligned ports and each having a lateral port communicating with the exterior of the body, said body also defining third and fourth chambers, each having a lateral port communicating with the exterior of the body, means defining conduits connecting the first ports of said first and second chambers with said third and fourth chambers respectively and additional means defining conduits connecting the second ports of said first and second chambers with said fourth and third chambers respectively, valve means mounted in each of said first and second chambers for movement to open and close said first and second ports, and fluid actuated, double-ended power means connected to move said valves, a valve chest, first and second valve covers mounted thereon, first and second pilot valves mounted in one cover and third and fourth pilot valves mounted in a second cover, ducts for connecting the first and third pilot valves to one end of the power means and the second and fourth pilot valves to the other end of said power means, operating means operable in one direction for actuating the first and fourth valves simultaneously and operable in another direction for actuating the second and third valves simultaneously, and means for applying fluid under one pressure from one of said lateral ports to one of said covers and additional means for applying fluid under a different pressure from another of said lateral ports to the other cover, solenoid means for moving said actuating means in one direction and means yieldably opposing said solenoid.

(References on following page)

References Cited in the file of this patent

UNITED STATES PATENTS

| | | |
|---|---|---|
| 685,662 | Anawalt | Oct. 29, 1901 |
| 1,501,408 | Lindstrom | July 15, 1924 |
| 1,551,651 | Everhart | Sept. 1, 1925 |
| 1,708,916 | Eisenhauer | Apr. 9, 1929 |
| 1,919,031 | Muhleisen | July 18, 1933 |
| 2,145,575 | Zwickl | Jan. 31, 1939 |
| 2,362,559 | Jauch | Nov. 14, 1944 |
| 2,443,679 | Glantzer | June 22, 1949 |
| 2,517,406 | Mott | Aug. 1, 1950 |
| 2,556,425 | Hinds | June 12, 1951 |
| 2,754,840 | Hicks | July 17, 1956 |
| 2,792,017 | Wiczer | May 14, 1957 |

FOREIGN PATENTS

| | | |
|---|---|---|
| 762,584 | Germany | Jan. 26, 1953 |